May 10, 1927.
J. L. BREESE, JR
FURNACE
Filed Jan. 16, 1926
1,627,591
2 Sheets-Sheet 2
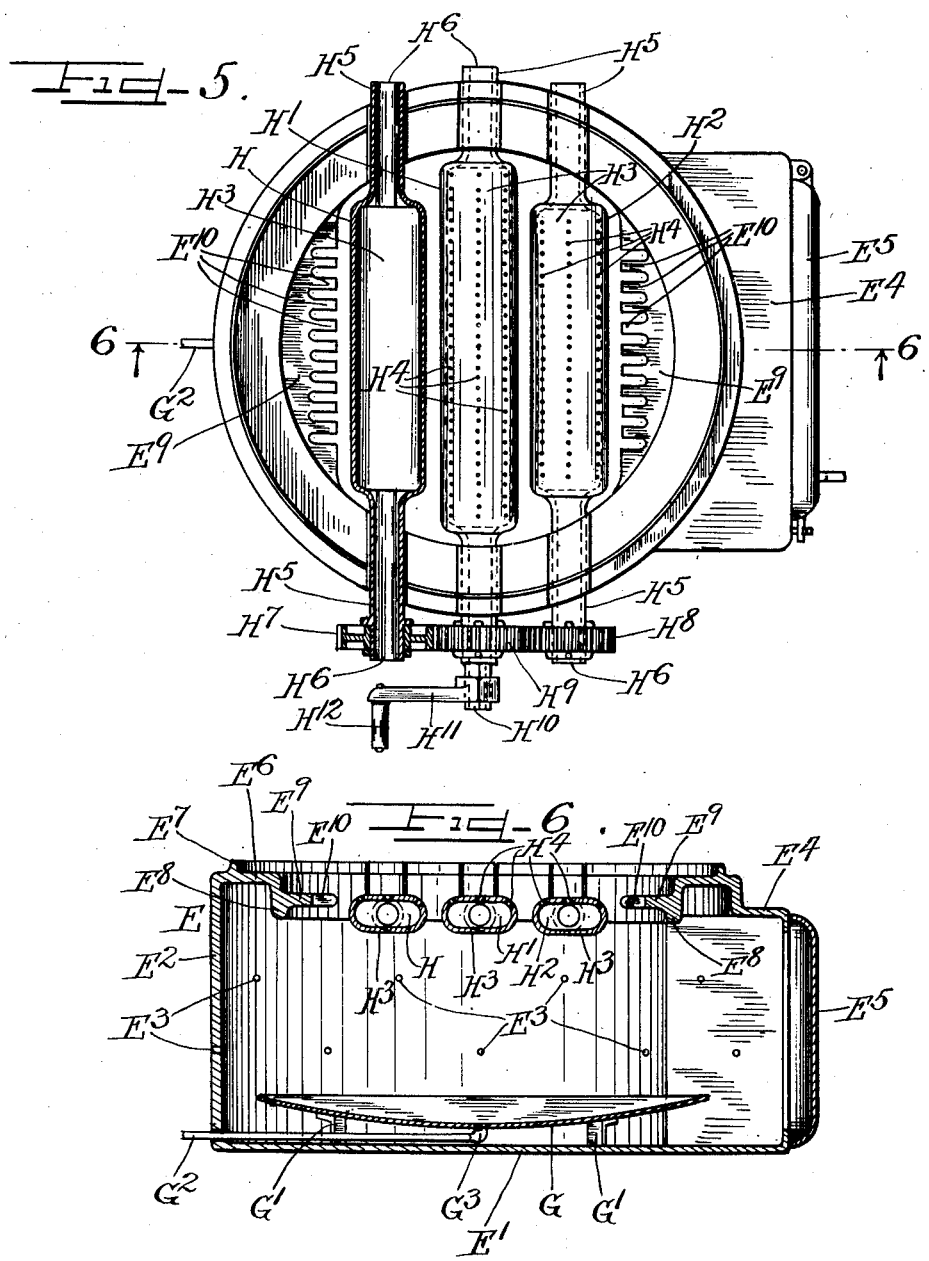
Inventor
James L. Breese Jr.
by Parker & Carter Attys.

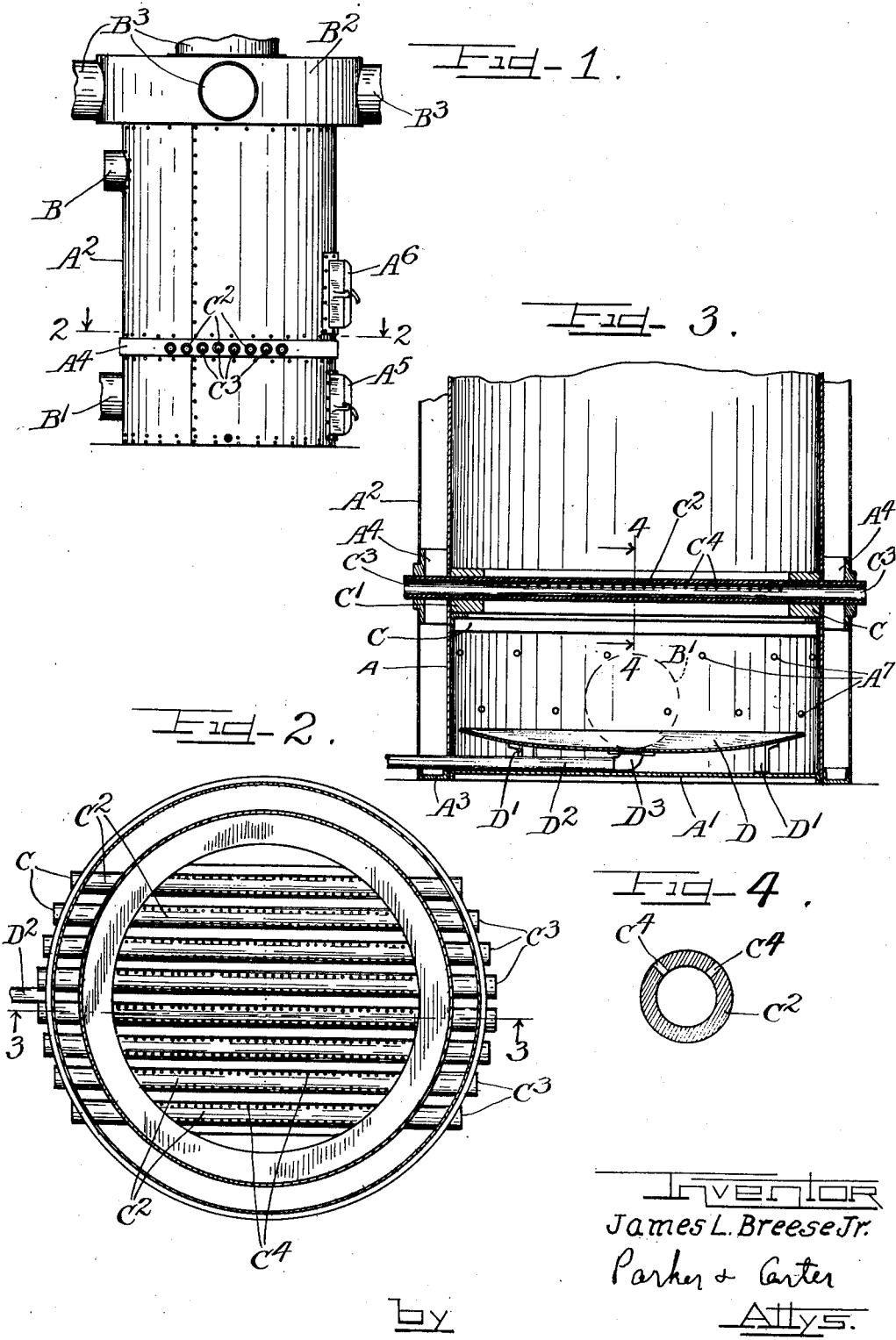

Patented May 10, 1927.

UNITED STATES PATENT OFFICE.

JAMES L. BREESE, JR., OF CHICAGO, ILLINOIS, ASSIGNOR TO OIL DEVICES CORPORATION, OF CHICAGO, ILLINOIS, A CORPORATION OF ILLINOIS.

FURNACE.

Application filed January 16, 1926. Serial No. 81,659.

My invention relates to a furnace. One object of my invention is to provide a furnace adapted for the burning of either a liquid fuel or of a solid fuel or of both. Another object is the provision of a furnace having elements adaptable for service either as grate bars in the burning of a solid fuel, such as coal, or as sources of air or oxygen for the burning of a liquid fuel, such as oil. Another object of my invention is the provision of a removable base or segment, containing mechanisms for accomplishing the purposes above set forth, which may be applied to or removed as a unit to the furnace, forming a segment or section in a sectional furnace structure. Other objects will appear from time to time in the course of the specification and claims.

I illustrate my invention more or less diagrammatically in the accompanying drawings, wherein—

Figure 1 is a side elevation of the furnace;

Figure 2 is a section on the line 2—2 of Figure 1;

Figure 3 is a section on the line 3—3 of Figure 2;

Figure 4 is a section on the line 4—4 of Figure 3;

Figure 5 is a plan view of a variant form having a removable furnace segment or section; and Figure 6 is a section on the line 6—6 of Figure 5.

Like parts are indicated by like symbols throughout the specification and drawings.

Referring to Figures 1 to 4, I illustrate a furnace, applied to a hot air heating system, although it will be understood that I do not wish to limit myself to the employment of my invention exclusively to hot air heating. In the structure herein shown A is the interior furnace shell provided for example with a bottom plate $A^1$. $A^2$ is an outer shell generally concentric with the shell A and spaced from it for example by the bottom circumferential channel iron $A^3$ and the intermediate spacing members $A^4$. $A^5$ $A^6$ are doors whereby access may be had to a central aperture of the furnace shell A. B is the flue outlet. $B^1$ is the air inlet or air return pipe to the space between the shells A and $A^2$. $B^2$ is an air outlet housing communicating with the space between the shells A and $A^2$ and associated with the air discharge lines or pipes $B^3$.

Positioned intermediate top and bottom of the furnace, but substantially nearer the bottom, is a circumferential interiorly projecting supporting angle C upon which is supported a ring $C^1$ in which are mounted a plurality of hollow grate bars $C^2$ having open ends $C^3$ communicating with their hollow interiors. They are perforated on their upper sides as at $C^4$, the perforations being shown as arranged in parallel lines, two rows along each grate bar. It will be understood however that the number, form and arrangement of perforations may be varied at will.

Positioned below the grate bars, and herein shown as supported upon the bottom $A^1$ of the furnace, is a concave plate D mounted upon feet or supports $D^1$. Communicating with its central portion is the fuel line $D^2$ adapted to deliver fuel through the elbow $D^3$ to the plate D. It will be realized that any suitable means may be employed for supplying fuel along the line $D^2$ of the plate D and controlling the flow thereto and the level of fuel in the plate, such means being not herein shown and forming no part of the present invention. The furnace wall or shell A is provided with a plurality of air inlets $A^7$ beneath the grate bars $C^2$ and generally above the plate D.

Referring to Figures 5 and 6 E generally indicates a furnace base section or segment adapted to be applied to a furnace structure wherein the furnace is built up of a plurality of superposed sections or segments. $E^1$ is the bottom plate thereof. It is herein shown as having formed integrally with it a generally cylindrical wall $E^2$ preferably at a plurality of points with the air inlet apertures $E^3$ and provided with a forwardly projecting section $E^4$ closed by the door $E^5$. $E^6$ is a flange inwardly projecting from the top of the wall $E^2$ which is in turn provided with the upwardly projecting centering flange $E^7$ and the downwardly projecting circumferential flange $E^8$. Inwardly projecting from the flange $E^8$ are the diametrically opposed flanges or wings $E^9$ $E^9$ the edges of which are toothed as at $E^{10}$.

Positioned within the section E and for example resting upon the bottom plate $E^1$ is a shallow dish G herein shown as relatively slightly cupped and supported upon a plurality of feet $G^1$. $G^2$ is a liquid fuel inlet pipe communicating by means of the elbow $G^3$ with the central area of the plate G. It will be understood that I may provide any suitable means, not herein shown and forming no part of the present invention, for feeding a liquid fuel to the cup G and for maintaining the level of the fuel in the cup G the desired level.

Rotatably mounted in the walls $E^2$ of the section E are a plurality of grate bar elements generally indicated as H $H^1$ $H^2$. They each consist of a central flattened enlarged hollow portion $H^3$ penetrated by a plurality of apertures $H^4$. The central section $H^3$ communicates at each end with tubular sections or stubs $H^5$ being open ended as at $H^6$ and thus providing communication with the atmosphere for the central portions $H^3$. The central bar $H^1$ is provided with a gear $H^9$ in mesh with similar gears or pinions $H^7$ $H^8$ on the bars H and $H^2$ respectively. The bar $H^1$ is continued beyond its pinion $H^6$ by a squared stub $H^{10}$ upon which may be mounted a crank arm $H^{11}$ with the handle $H^{12}$. It will be understood that rotation of the crank rotates the three grate bars in unison.

The use and operation of my invention are as follows:

I have illustrated a furnace which may be employed alternatively for the burning of oil and of coal. In burning oil with my furnace I deliver to the plate D of Figure 3 or to the plate G of Figure 6 sufficient liquid fuel to spread out upon the pan throughout a considerable area. Air is admitted through the apertures $A^7$ or $E^8$ into the zone between the pan and the bars. However this air is insufficient to support complete combustion and what I call primary combustion takes place beneath the grate bars the hydrogen being burned off below the bars. As the vaporized oil, mixed with air, passes through the primary combustion zone and reaches the level of the grate bars it is mixed with the inflowing air discharged through the grate bar apertures, and the secondary, in effect the main combustion takes place.

Referring to Figures 5 and 6, I have illustrated a base section or segment which can be applied to any existing furnace of the segmental type, in order to adapt it for the burning in it of either coal or oil.

I have illustrated merely the segment or base section, since the details of the remainder of the furnace form no part of the present invention, and I have shown a segment of generally circular cross section. It will be realized however, that I may modify my segment or section to conform to the shape of any segmental furnace, or any furnace the base section of which is removable.

Assuming the application of my furnace or furnace section to the burning of coal the fire is built upon the grate bars in the usual manner. If desired the bars may be turned to the reverse of the position shown in Figure 6, namely with the air apertures $H^4$ positioned on the under side of the bars, in order to prevent plugging up of the apertures by ash or carbon. When the fire needs to be shaken the crank $H^{11}$ is employed and the grate bars operate in the usual fashion, there being sufficient clearance between the grate bars and the flanges $E^9$ to permit the passage of air for combustion and the discharge of ash from the fire bed. Under some circumstances it may be desirable to employ the grate bars with the apertures $H^4$ up and thus to permit air to flow inwardly through the hollow stubs $H^5$ directly into the fire bed.

Referring to the alternative use of my furnace or base section as an oil burner, I deliver the liquid fuel along the line $G^2$ to the plate G.

I claim:

1. A furnace for the burning of liquid and solid fuels, an upwardly concave liquid fuel receptacle positioned in the lower portion thereof and a fuel supply line extending thereto, the wall of the furnace being penetrated by a plurality of spaced air inlet apertures, a plurality of grate bar members mounted in said furnace and overlying said fuel receptacle, said bars being provided with air inlet apertures, and with air outlet apertures located within the furnace.

2. A furnace for the burning of liquid and solid fuels, means for supplying a liquid fuel to the lower portion thereof, the wall of the furnace being penetrated by a plurality of spaced air inlet apertures above the normal level of said fuel, a plurality of grate bar members mounted in said furnace and overlying said fuel, said bars being provided with air inlet apertures, and with air outlet apertures located within the furnace.

3. A furnace for the burning of liquid and solid fuels, an upwardly concave fuel receptacle associated with the lower portion thereof and a fuel supply line extending thereto, a plurality of grate bar members mounted in said furnace and overlying said fuel receptacle, said bars being provided with air inlet apertures and with air outlet apertures located within the furnace, the wall of the furnace beneath said grate bars and above the normal level of the fuel being penetrated by a plurality of spaced air inlet apertures.

4. A furnace for the burning of liquid and solid fuels, an upwardly concave liquid fuel receptacle positioned in the lower portion thereof and a fuel supply line extending thereto, the wall of the furnace being penetrated by a plurality of spaced air inlet apertures, a plurality of grate bar members mounted in said furnace and overlying said fuel receptacle, said bars being provided with air inlet apertures, and with air outlet apertures located within the furnace, and means for rotating said bars.

5. A furnace for the burning of liquid and solid fuels, means for supplying a liquid fuel to the lower portion thereof, the wall of the furnace being penetrated by a plurality of spaced air inlet apertures above the normal level of said fuel, a plurality of grate bar members mounted in said furnace and overlying said fuel, said bars being provided with air inlet apertures, and with air outlet apertures located within the furnace, and means for rotating said bars.

6. A furnace for the burning of both liquid and solid fuel, a liquid fuel burner element in the lower portion thereof, comprising a broad, shallow concave pan, and means for supplying a liquid fuel thereto, a base furnace section surrounding said pan, a plurality of small spaced air inlet apertures therein, a plurality of hollow grate bars positioned above said pan, and air outlet apertures in said bars adapted to deliver a secondary air supply to the mixture of gasified hydrocarbon and air rising upwardly through the grate bars.

Signed at Chicago county of Cook and State of Illinois, this 12th day of January, 1926.

JAMES L. BREESE, Jr.